United States Patent [19]

Soumi et al.

[11] Patent Number: 4,937,606
[45] Date of Patent: Jun. 26, 1990

[54] BATTERY HOLDING DEVICE

[75] Inventors: Mitsuo Soumi, Tokyo; Naoki Kobayashi, Omiya, both of Japan

[73] Assignee: Fuji Photo Film Co., Ltd., Kanagawa, Japan

[21] Appl. No.: 358,753

[22] Filed: May 30, 1989

[30] Foreign Application Priority Data

May 30, 1988 [JP] Japan .................. 63-132276

[51] Int. Cl.⁵ .................................. G03B 17/02
[52] U.S. Cl. .................................... 354/288
[58] Field of Search ............... 354/288, 145.1, 149.11, 354/484; 352/242

[56] References Cited

U.S. PATENT DOCUMENTS 4,645,325  2/1987  Inoue et al. .................. 354/484
4,697,909  10/1987  Machida et al. .............. 354/484

FOREIGN PATENT DOCUMENTS 1533837  7/1968  France .................. 354/288

OTHER PUBLICATIONS

Research Disclosure, Feb. 1977, p. 27, "Lid for a Photographic or Cinematographic Camera or Flash Unit", 15436.
Research Disclosure, Jul. 1979, p. 370, "Battery Lid for Photographic Apparatus", 18334.

Primary Examiner—Brian W. Brown
Attorney, Agent, or Firm—Sughrue, Mion, Zinn, Macpeak & Seas

[57] ABSTRACT

A battery holding device disposed in a battery case in a main body of a camera. In the battery holding device, there is provided a slidable and rotatable battery cover in a battery insertion opening in the battery case. The battery cover can remove the engagement of a battery by an engagement member in a position where the insertion opening is closed and also can open the battery insertion opening in a rotatable position.

6 Claims, 5 Drawing Sheets

BATTERY HOLDING DEVICE

BACKGROUND OF THE INVENTION

1. Field of the Invention

The present invention relates to a battery holding device and, in particular, to a battery holding device which is used to hold a battery mounted into a battery case disposed within an apparatus such as a camera and the like.

2. Description of the Related Art

Recently, there has been developed an attractive television system in which an image pickup device such as a solid image pickup element, an image pickup tube or the like is combined with a memory device using as a recording medium an inexpensive magnetic disc having a relatively large memory capacity to thereby still photograph an object electronically and record the image of the object into the rotating magnetic disc, while the recorded object image can be reproduced by a separately arranged device.

In an electronic still camera for use in such television system, the magnetic disc serving as a magnetic recording medium is rotated at a high speed and, in this condition, video signals are recorded by a magnetic head into one of annular tracks provided in the magnetic disc. This requires a power source for a motor which is used to rotate the magnetic disc at the high speed. Also, in the electronic still camera, as in other kinds of ordinary cameras, a power source for lenses, shutter and the like is necessary and such power source is provided by loading a removable battery into a grip portion of a camera main body or the like.

Generally, the battery for use in such an electronic still camera is inserted from the bottom surface of the camera into a battery case provided within the grip portion of the camera main body and the thus inserted battery is then secured within the battery case by a lock lever. That is, the lock lever can be brought into engagement with a recessed portion for engagement formed in the battery or with the bottom surface of the battery to thereby secure the battery within the battery case. In order to remove the battery from the battery case, an external operation member, which is coupled with the lock lever, is operated to remove the engagement between the lock lever and the battery, thereby dismounting the battery from the battery case.

However, in the above-mentioned prior art battery holding structure, the external operation member coupled with the lock lever may be rotated unexpectedly to detach the battery from the battery case. Also, a connecting mechanism is required for coupling the external operation member with the lock lever, which disadvantageously increases the number of parts. In addition in a structure in which there is provided only the lock lever for the battery but the battery case has no cover therefor, there is the possibility of dust or the like entering the battery case.

SUMMARY OF THE INVENTION

The present invention aims at eliminating the drawbacks found in the above-mentioned prior art device.

Accordingly, it is an object of the invention to provide a battery holding device which includes a reduced number of parts, is simple in structure, and is dustproof.

In order to attain the above object, according to the invention, there is provided a battery holding device which comprises: an engagement member disposed in an insertion opening of a battery case provided in a main body of a camera for locking a battery within the battery case when the battery is completely inserted into the battery case; a battery cover disposed slidably and rotatably in the insertion opening of the battery case for opening the insertion opening by locating a rotary shaft in a rotatable position; and, an engagement removing member disposed in the battery cover for removing the locking of the engagement member in a closed position of the battery cover.

According to the battery holding device of the present invention, at first, if the battery is inserted into the battery case, then the battery is secured by a lock lever. Next, if the battery cover is closed, then the locking or securement of the battery by the lock lever can be removed. Also, since the battery is supported by a projection disposed adjacent to a support portion of the battery cover, there is eliminated the possibility that the battery cover may be deformed due to changes of temperatures and the like.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a battery holding device according to the present invention with reference to the accompanying drawings.

Figure 1:
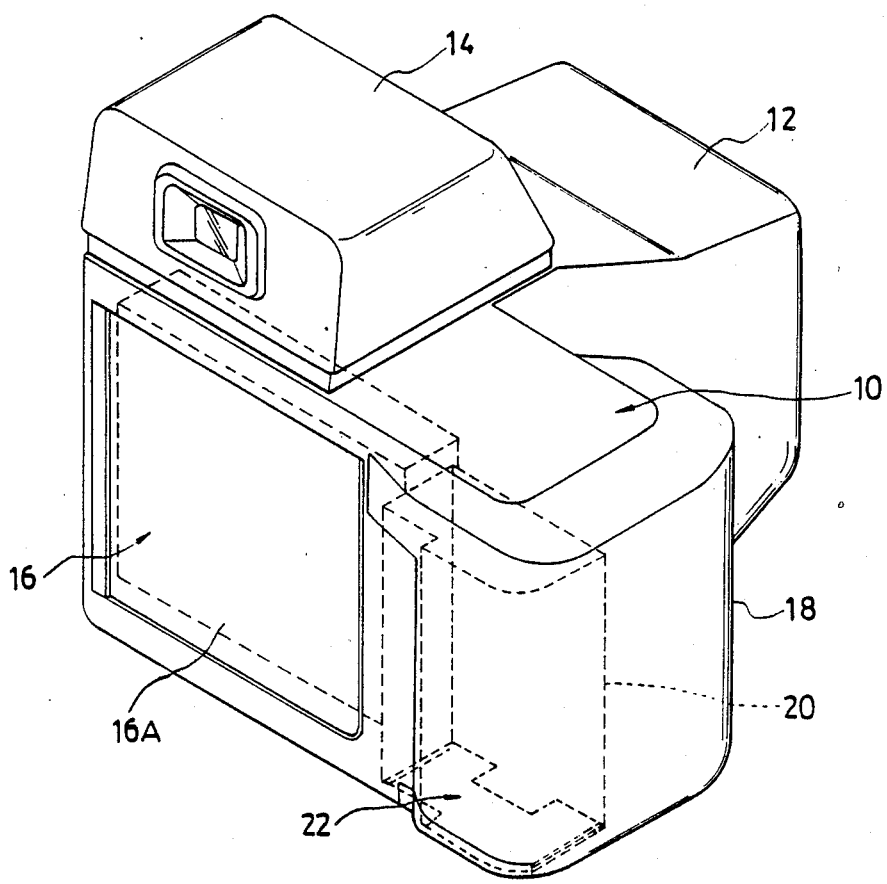
FIG. 1 is a perspective view of an external appearance of an electronic still camera to which a battery holding device according to the invention is applied.

Referring first to FIG. 1, there is shown an external appearance of an electronic still camera according to the present invention, in which the electronic still camera has a camera body 10, a taking lens mount 12 is disposed on the front surface of the camera body 10, a finder 14 is arranged on the upper surface of the camera body 10, and a loading device 16 for a magnetic disc is provided on the back surface of the camera body 10. Although the details of the magnetic disc loading device 16 are not shown in this figure, the loading device 16 is arranged such that the magnetic disc can be loaded into a holder (not shown) by opening a cover 16A thereof. If the cover 16A is closed, then the magnetic disc in a magnetic disc pack can be connected with a drive shaft (not shown) and also magnetic recording and reproduction can be realized by use of a magnetic head.

Figure 2:
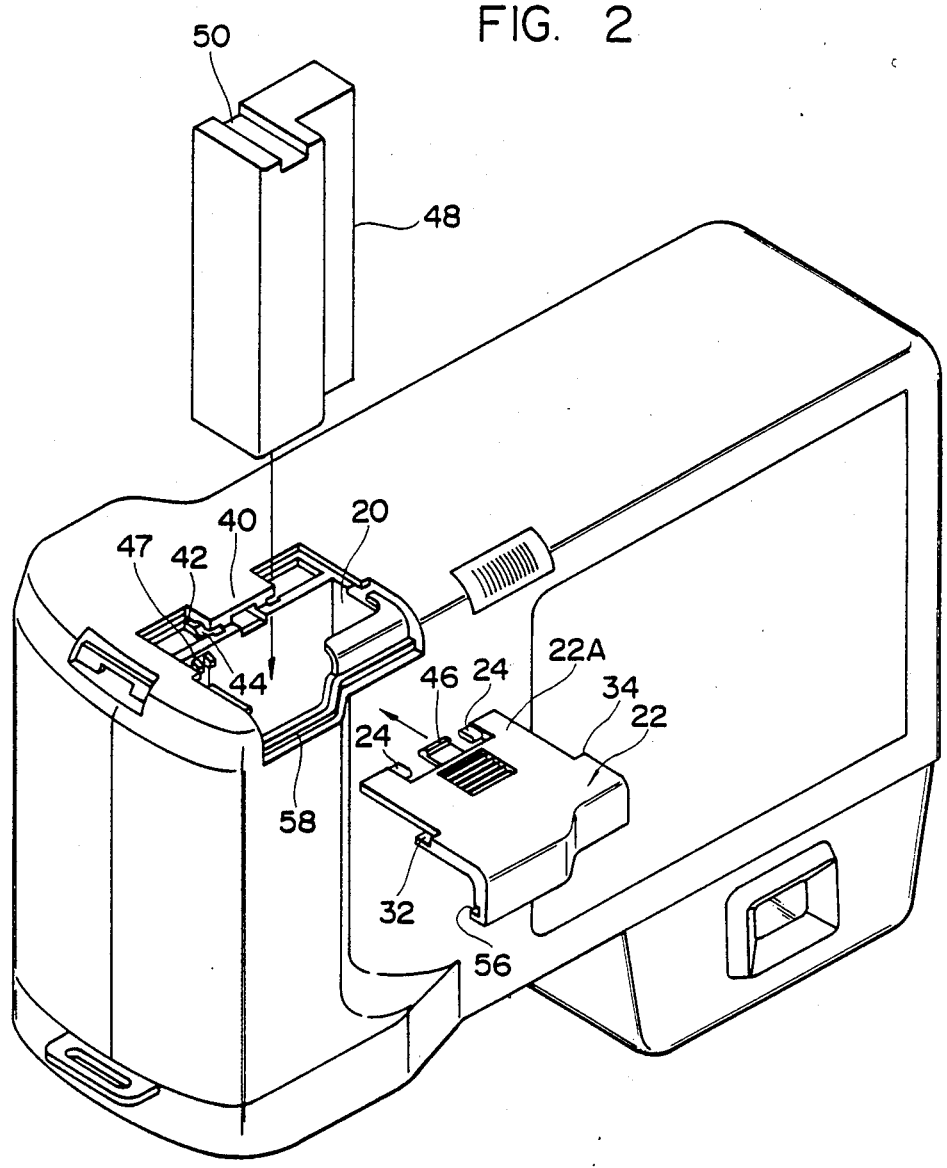
FIG. 2 is a perspective view taken from the bottom surface side of the electronic still camera shown in FIG. 1.
Figure 3:
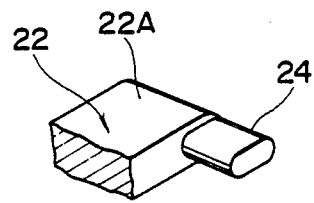
FIG. 3 is a partial perspective view of a rotary shaft of a battery cover.
Figure 4:
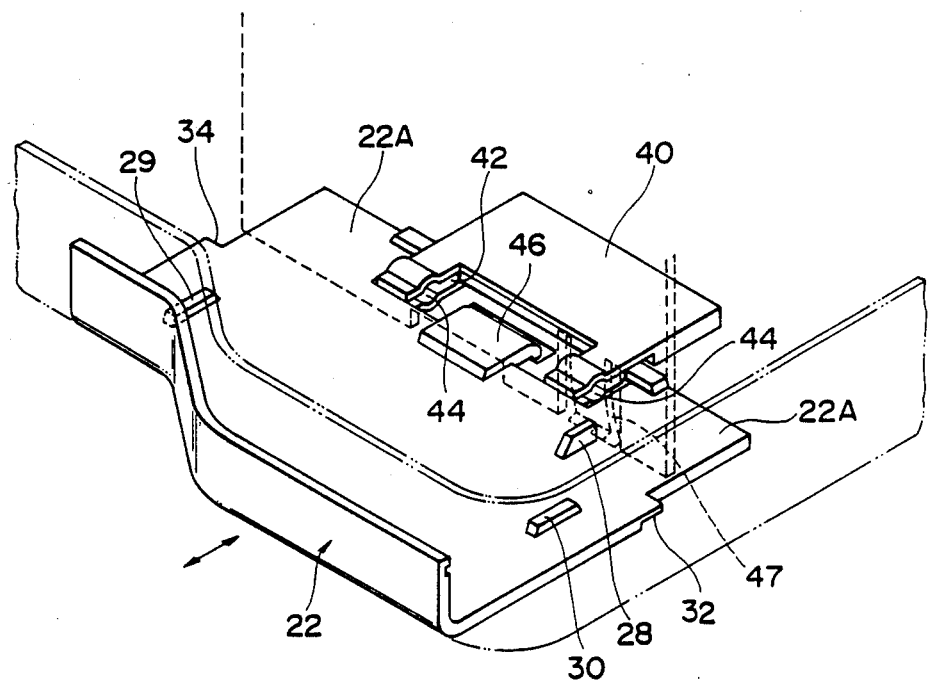
FIG. 4 is a perspective view of main portions of the electronic still camera shown in FIG. 2, observed from the inside thereof.

On the right side of the camera body 10 in FIG. 1 there is formed a grip portion 18 and further within the grip portion 18 there is provided a battery case 20. On the lower surface of the battery case 20, there is mounted a battery cover 22 such that it is freely slidable and rotatable. Also, the peripheral structure of the battery cover 22 is illustrated in detail in FIG. 2. The battery cover 22 includes a rear end portion 22A in which shafts 24, 24 are provided. The shaft 24, as shown in part in FIG. 3, has an elliptically shaped section. Between the two shafts 24 and 24, there is provided an engagement claw 46 which is shown in FIG. 2. Also, the battery cover 22 is provided in the rear surface thereof with a projection 28 which is shown in FIG. 4 and the projection 28 is used to remove the engagement of a battery engagement claw 47 which will be discussed later. Further, on the side edges of the battery cover 22 there are provided step portions 32, 34. These two step portions 32, 34 can be respectively fitted into step portions 52, 54 provided in the camera body to be discussed later, whereby the battery cover 22 can be supported onto the camera body. On the rear surface of the battery cover 22, as shown in FIG. 4, there are provided projections 29, 30 adjacent to the above-mentioned step portions 32, 34. The two projections 29, 30 are used to support a battery 48.

Figure 5:
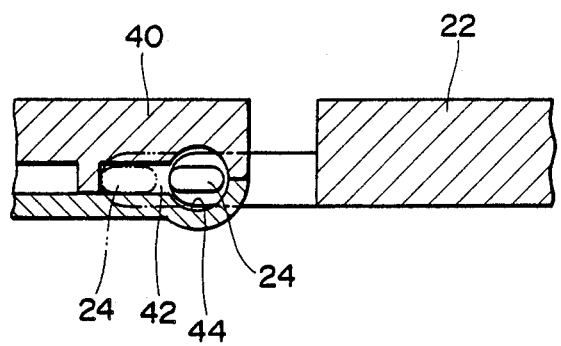
FIG. 5 is a section view of a structure for supporting the battery cover in a slidable and rotatable manner.

Next, a description will be given below of a support structure for the battery cover 22 arrange adjacent to the entrance of the battery case 20. As shown in FIG. 2, there is provided projection piece 40 such that it faces the entrance of the battery case 20, and there is formed a groove 42 in the projection piece 40. The groove 42 is formed such that it is equal in size to the shorter diameters of the shafts 24, 24 provided in the battery cover 22, as shown in FIG. 5. Also, in the central portion of the groove 42 there is formed a hole 44 and the hole 44 is arranged such that it is equal in size to the longer diameter of the shaft 24. For this reason, while the shafts 24, 24 are fitted into the groove 42, the battery cover 24 cannot be rotated within the groove 42 but, if the shafts 24, 24 are situated within the hole 44, then the battery cover 24 can be rotated and thereby can be opened.

Figure 6:
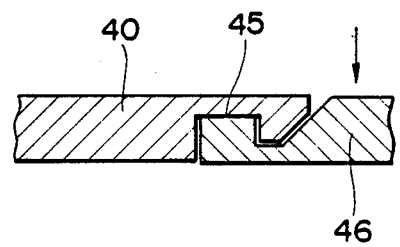
FIG. 6 is a section of an engagement structure of the battery cover.

On the other hand, as shown in FIG. 6, on the rear surface of the projection 40 there is formed a recessed portion 45 for engagement. An engagement piece 46 provided in the battery cover 22 can be fitted into the engagement recessed portion 45 to thereby lock the battery cover 22. In the engagement means shown in FIG. 6, if the battery cover 22 is pushed downwardly as shown by an arrow, then the engagement between the engagement piece 46 of the battery cover 22 and the recessed portion 44 provided on the side of the camera body can be removed.

Figure 7:
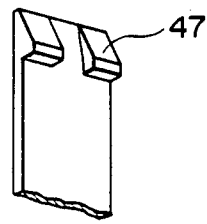
FIG. 7 is a perspective view of an engagement claw member of a battery.
Figure 8:
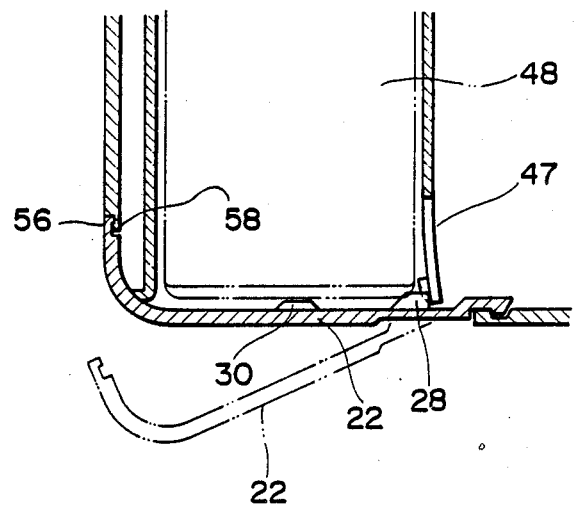
FIG. 8 is a section view to shown the removed state of the engagement claw member; and, FIG. 9 is a plan view of the bottom surface of the camera adjacent to the battery cover.

As shown in an enlarged manner in FIG. 7, adjacent to the entrance of the battery case 20 there is provided a battery engagement claw 47. The engagement claw 47 is arranged such that, when the battery 48 is inserted into the battery case 20, it is able to fit into the recessed portion 50 to thereby secure the battery 48 within the battery case 20. That is, when the battery 48 is inserted into the battery case 20, the engagement claw 47 is flexed to thereby allow the battery 48 to be inserted, and, when the battery 48 is completely inserted, the engagement claw 47 recovers to the initial position to thereby secure the battery 48. In this state, if the battery cover 22 is inserted, then the projection 28 provided in the battery cover 22 pushes against the engagement claw 46 to thereby remove the engagement thereof, as shown in FIG. 8.

Figure 9:
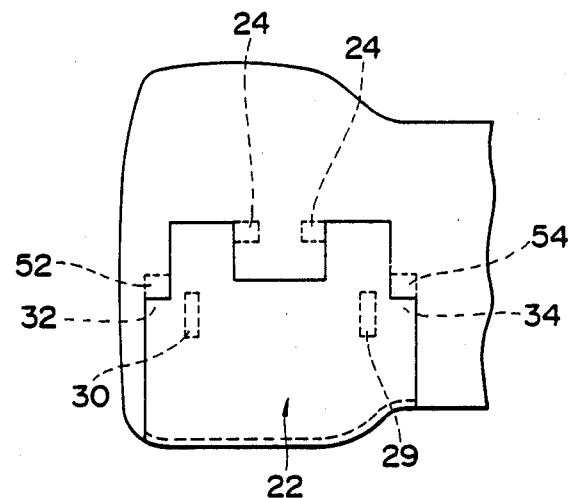

On the two side edges of the battery case 20, as shown in FIG. 9, there are provided the step portions 52 and 54 and, if the battery cover 22 is inserted, then the step portions 32 and 34 provided on the side edges of the battery cover 22 are fitted into the step portions 52 and 54, respectively.

As described before, in the battery cover 22, there are provided the projections 29, 30 in the neighborhood of the above mentioned step portions 32, 34 which can form a support portion for the battery 48 when the engagement by the engagement claw 46 of the battery 48 is removed. In this case, due to the fact that the projections are disposed adjacent to the step portions 32, 34, respectively and thus the step portions 32, 34 can be supported by the step portions 52, 54 on the side of the camera main body even when the total weight of the battery 48 is loaded, there is eliminated the possibility that the battery cover 22 may be deformed even if temperatures would vary while it is receiving the weight of the battery.

Also, there is formed a recessed portion 56 for engagement in the front edge of the battery cover 22 and a projection 58 provided on the side of the camera main body can be fitted into the engagement recessed portion 56, thereby improving a dustproof effect.

Next, description will be given below of the operation of the battery holding device constructed in the above-mentioned manner according to the present invention. At first, the shafts 24, 24 of the battery cover 22 are situated in the hole 44 and are then rotated in the opening direction thereof and next the battery 48 is inserted into the battery case 20. When the battery 48 is completely inserted into the battery case 20, the engagement claw 46 is brought into engagement with battery recessed portion 50 to thereby secure the battery 48 within the battery case 20. After that, the shafts 24, 24 of the battery cover 22 are pushed into the grooves 42, 42 on the side of the camera body to thereby close the entrance of the battery case 20. In this case, as shown in FIG. 4, the locking of the battery engagement claw 46 is removed by the projection 28 provided on the rear surface of the battery cover 22 and at the same time the battery 48 can be supported by the projections 29, 30.

In order to take out the battery 48, the battery cover 22 may be pushed in the direction of an arrow shown in FIG. 6 to thereby remove the engagement between the engagement claw 46 and the recessed portion 45. Next, the battery cover 22 is moved forwardly and the shafts 24 are situated in the hole 44. In this condition, the battery cover 22 can be rotated about the shafts 24, whereby the battery 48 can be taken out from the battery case 20.

In the illustrated embodiment, because the battery 48 is supported by the projections 29, 30 provided on the rear surface of the battery cover 22 and also because these projections 29, 30 are disposed in the support portions 32, 34 of the battery cover 22, there is eliminated the possiblity that the battery cover 22 may be deformed even when the openair temperature goes high.

As described heretofore, according to the battery holding device of the invention, due to the fact that, if the battery cover is inserted, then the locking of the battery engagement claw can be removed, it is possible to simplify the structure of the battery holding device. Also, due to provision of the cover in the battery case, a dustproof effect can be improved as well.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A battery holding device for use with a camera having a main body, said battery holding device comprising:
   battery engagement means disposed in a battery insertion opening in a battery case provided in said main body for securing a battery within said battery case when said battery is inserted completely into said battery case;
   battery cover means disposed slidably and rotatably in said battery insertion opening in said battery case for opening said battery insertion opening by locating a rotary shaft in a rotatable position; and,
   engagement removing means disposed in said battery cover means for removing said securing of said battery by said engagement means in a closed position of said battery cover means.

2. A battery holding device as set forth in claim 1, wherein said rotary shaft of said battery cover means is an elliptical shaft, and in said battery insertion opening in said battery case there are formed a hole for rotation having a diameter substantially equal to the longer diameter of said elliptical shaft and a slide groove communicating with said rotation hole and being equal in size to the shorter diameter of said elliptical shaft, whereby said battery cover means opens said battery insertion opening when said elliptical shaft is situated in said rotation hole and closes said battery insertion opening when said elliptical shaft is slid in said slide groove in a closing direction of said battery insertion opening.

3. A battery holding device as set forth in claim 1, wherein said battery engagement means is ian engagement piece which is disposed facing said battery insertion opening and is elastically deformable.

4. A battery holding device as set forth in claim 3, wherein said engagement removing means is a projection which is disposed in said battery cover means and, when said battery cover means is in the closed position thereof, is able to push and deform said engagement piece.

5. A battery holding device as set forth in claim 1, wherein in said battery cover means there is provided support means for supporting said battery after said battery is removed from the engagement thereof.

6. A battery holding device as set forth in claim 5, wherein said support means is disposed adjacent to the engagement portion between said battery cover means and said main body.

* * * * *